(12) United States Patent
Dinev

(10) Patent No.: US 9,571,711 B2
(45) Date of Patent: Feb. 14, 2017

(54) ILLUMINATION APPARATUS WITH INTEGRATED POWER AND SECONDARY ILLUMINATION PROVISIONS

(71) Applicant: Imperx, Inc., Boca Raton, FL (US)

(72) Inventor: Petko Dimitrov Dinev, Boca Raton, FL (US)

(73) Assignee: Imperx, Inc., Boca Raton, FL (US)

( * ) Notice: Subject to any disclaimer, the term of this patent is extended or adjusted under 35 U.S.C. 154(b) by 166 days.

(21) Appl. No.: 14/627,020

(22) Filed: Feb. 20, 2015

(65) Prior Publication Data

US 2016/0072991 A1 Mar. 10, 2016

Related U.S. Application Data

(63) Continuation-in-part of application No. 14/479,454, filed on Sep. 8, 2014, now Pat. No. 9,319,575.

(51) Int. Cl.
*H04N 5/225* (2006.01)
*H04N 5/232* (2006.01)
(Continued)

(52) U.S. Cl.
CPC ............ *H04N 5/2256* (2013.01); *G06F 1/266* (2013.01); *H04L 12/10* (2013.01); *H04N 5/23206* (2013.01); *H04N 5/23241* (2013.01)

(58) Field of Classification Search
CPC .............. H04N 5/2256; H04N 5/23203; H04N 5/23241; G06K 2209/401; G06K 9/2027; G03B 9/70; G03B 15/04; G03B 7/16; G03B 29/00; G03B 2215/05; G03B 15/02; G03B 2215/0557; G03B 15/05; H05B 37/0263
See application file for complete search history.

(56) References Cited

U.S. PATENT DOCUMENTS 5,010,412 A 4/1991 Garriss
6,483,254 B2 11/2002 Vo et al.
(Continued)

FOREIGN PATENT DOCUMENTS

WO 0041496 7/2000

OTHER PUBLICATIONS

Notice of Allowance dated Dec. 17, 2015, received for U.S. Appl. No. 14/479,454.

(Continued)

*Primary Examiner* — Nelson D. Hernández Hernández
(74) *Attorney, Agent, or Firm* — Fleit Gibbons Gutman Bongini Bianco PL; Jon A. Gibbons

(57) ABSTRACT

Power for an illumination device and a camera is provided from power integrated onto a data cable between a controller/computer and the light illumination device. The camera-controller/computer interface includes one of GEV with PoE, USB and CXP, where a power is provided within the data interface cable, and the distance between the camera and the controller/computer is very long. In order to avoid running multiple long cables in a production manufacturing environment, a power extraction module is incorporated into a light illuminator, in order to extract the power for the interface cable, and to generate the individual powers for the light illuminator and the camera. In cases where the interface standard does not provide integrated power, power can be injected to the cable and extracted from the light illumination module. The light illuminator may electrically and mechanically support secondary and/or supplemental light illuminators.

20 Claims, 7 Drawing Sheets

(51) Int. Cl.
*G06F 1/26* (2006.01)
*H04L 12/10* (2006.01)

(56) References Cited

U.S. PATENT DOCUMENTS

| | | |
|---|---|---|
| 7,095,187 B2 | 8/2006 | Young |
| 7,208,881 B2 | 4/2007 | Young |
| 8,773,276 B2 | 7/2014 | Savage, Jr. |
| 2002/0101189 A1 | 8/2002 | Vo et al. |
| 2004/0038169 A1 | 2/2004 | Mandelkern et al. |
| 2005/0128097 A1 | 6/2005 | Piccolo, III et al. |
| 2005/0157205 A1 | 7/2005 | Voss et al. |
| 2008/0197790 A1 | 8/2008 | Mangiaracina et al. |
| 2008/0290729 A1 | 11/2008 | Schoenberg et al. |
| 2009/0091630 A1 | 4/2009 | Bollhorst |
| 2011/0128436 A1 | 6/2011 | Ohsuga et al. |
| 2012/0271477 A1 | 10/2012 | Okubo et al. |
| 2012/0319468 A1 | 12/2012 | Schneider et al. |
| 2014/0172133 A1 | 6/2014 | Snyder |

OTHER PUBLICATIONS

Extended European Search Report dated Apr. 29, 2016, received for European Application No. 16151368.4.
Extended European Search Report dated Jun. 28, 2016, received for European Application No. 15184321.6.

ILLUMINATION APPARATUS WITH INTEGRATED POWER AND SECONDARY ILLUMINATION PROVISIONS

RELATED APPLICATIONS

This application is a continuation in part of U.S. application Ser. No. 14/479,454 entitled ILLUMINATION APPARATUS WITH INTEGRATED POWER PROVISION, filed on Sep. 8, 2014.

BACKGROUND

The present description generally relates to image illumination and image capturing processes and configuration of associated devices.

Almost every modern manufacturing process or apparatus uses machine vision systems. These systems ensure fast, accurate and repeatable results, and thus guaranteeing a consistent quality over time. The main components of every machine vision systems is an image capturing camera apparatus comprising of a CCD or CMOS image sensor, and a light illuminator comprising which may include LED illuminators, a control circuit, and an external power supply. The camera and the light illuminator require external power for operation. The distance between camera and the illuminator may be very short. In some examples, the illuminator may be physically attached to the camera. However, the distance between the camera and the host computer or controller may be very long. In case of a GEV or CXP interface between the controller and the camera, the length of the cable can be up to 100 meters or longer. In addition, in most cases the input voltage requirements for the camera and the light illuminator are different. For example, 24 V may be used for the illuminator while 12 V may be used for the camera. This results in three long cables to support a single camera system, two cables for power and one cable for data. This adds wiring challenges, especially if the cables have to be routed through tight places in a production or assembly line environment, which is very common on the manufacturing floor. In addition to occupying space in a tight environment, the result adds costs for material and labor in the installation as well as maintenance of the system over time.

Machine vision systems benefit from illumination which is typically provided by the light illuminator. In some applications a single light illuminator may not provide a desired intensity of illumination or a desired radiation pattern of light. In such applications, additional light illuminators may be appropriate. However, adding light illuminators in a manufacturing environment requires additional mounting hardware to secure the additional light illuminators, additional power sources to power the additional light illuminators, additional cabling to deliver power to the additional light illuminators, and additional control mechanisms to adjust light intensity. Thus, adding additional light illuminators may result in additional costs for installation, cabling and controls as well as maintenance of the system over time.

SUMMARY

A light illumination apparatus comprises: a first connector adapted to receive an integrated power and data stream from an external controller, the integrated power and data stream having a source power component at a source voltage combined with a data stream component on a conductor of the first connector; an illumination module generating light upon receiving a first power component at a first voltage; a second connector adapted to communicate the data stream component with an external camera apparatus for modulating the data stream component with a digital representation of a received image upon receiving operating power from a second power component; a power extraction module coupled to the first connector, the second connector, and the illumination module, the power extraction module adapted to extract the source power component from the integrated power and data stream, extract the data stream component from the integrated power and data stream, communicate the data stream component between the first connector and the second connector, convert a first portion of the source power component to the first power component at the first voltage, apply the first power component to the illumination module, supply a second portion of the source power component to the second power component, provide the second power component to the external camera apparatus; and a housing adapted to house the first connector, the illumination module, the second connector, and the power extraction module.

A system comprises: an external controller having a first controller connector having a first integrated power and data stream, and a second controller connector having a second integrated power and data stream; a first light illumination apparatus coupled to the first controller connector and adapted to illuminate a first object by consuming a first portion of first power received from the first integrated power and data stream, and to generate a first camera power by consuming a second portion of first power received from the first integrated power and data stream; a first long cable for coupling the first integrated power and data stream between the first controller connector and the first light illumination apparatus; a first camera apparatus coupled to the first light illumination apparatus and adapted to generate a digitized first image of the first object illuminated by the first light illumination apparatus by consuming the first camera power received from the first light illumination apparatus; a first short data cable for coupling a first data stream component of the first integrated power and data stream between the first camera apparatus and the first light illumination apparatus, the first camera apparatus further adapted to modulate the digitized first image upon the first data stream component for communication to the external controller; a first short power cable for coupling the first camera power from the first light illumination apparatus to the first camera apparatus, wherein a length of the first long cable is at least one hundred times greater than a length of the first short power cable; a second light illumination apparatus coupled to the second controller connector and adapted to illuminate a second object by consuming a first portion of second power received from the second integrated power and data stream, and to generate second camera power by consuming a second portion of second power received from the second integrated power and data stream; a second long cable for coupling the second integrated power and data stream between the second controller connector and the second light illumination apparatus; a second camera apparatus coupled to the second light illumination apparatus and adapted to generate a digitized second image of the second object illuminated by the second light illumination apparatus by consuming the second camera power received from the second light illumination apparatus; a second short data cable for coupling a second data stream component of the second integrated power and data stream between the second camera apparatus and the second light illumination apparatus, the second camera apparatus adapted to modulate the digitized second image upon the second data stream component for communication to the external controller; and a second short power cable for coupling the second camera power from the second light illumination apparatus to the second camera apparatus, wherein a length of the second long cable is at least one hundred times greater than a length of the second short power cable.

A method performed within a housing of a light illumination apparatus comprises: receiving an integrated power and data stream from an external controller at a first connector of the light illumination apparatus, the integrated power and data stream having a source power component at a source voltage and a data stream component, the source power component and the data stream component integrated on a conductor of the first connector; separating the source power component and the data stream component from the integrated power and data stream; communicating the data stream component to a second connector for coupling the data stream component to an external camera apparatus; converting a first portion of the source power component to a first power component at a first voltage; applying the first power component to an illumination module for illuminating an object; converting a second portion of the source power component to a second power component at a second voltage different from the first voltage and different from the source voltage; providing the second power component to the external camera apparatus, the external camera apparatus able to receive an image of the object, produce a digitized image of the object, and modulate the digitized image of the object upon the data stream component; and communicating the data stream component including the digitized image of the object from the second connector to the first connector.

A light illumination apparatus comprises an illumination module having a directional illumination for illuminating an object; a first interface for receiving source power and communicating a data stream with a system controller, the data stream including a digital representation of an image of the object; a second interface for attaching a camera apparatus to the light illumination apparatus to receive the image of the object, transmitting power to the camera apparatus, and communicating the data stream with the camera apparatus; and a third interface for transmitting power to a secondary illumination apparatus having a second directional illumination, and mounting the secondary illumination apparatus to direct the second directional illumination to illuminate the object. The first interface may further include a primary mount for removably attaching the light illumination apparatus to a device coupled to the object and directing the directional illumination towards the object. The first interface may further include a first connector for communicating the data stream with the system controller and an auxiliary connector for receiving the source power from an auxiliary power source. The first interface includes a first connector for receiving an integrated power and data stream from the system controller, the integrated power and data stream having the source power combined with the data stream on a conductor of the first connector. The second interface may further include a first mount for attaching the camera apparatus to the light illumination apparatus and directing the camera apparatus to receive the image of the object and at least a second connector for transmitting the power to the camera apparatus and communicating the data stream with the camera apparatus. The third interface may include a second mount for attaching the secondary illumination apparatus to the light illumination apparatus and directing the second directional illumination towards the object and a fourth connector for transmitting the power to the secondary illumination apparatus. The light illumination apparatus may further comprise a brightness control interface for receiving a brightness control signal wherein the light illumination apparatus adjusts the intensity of the directional illumination based upon the brightness control signal, and the third interface further communicates the brightness control signal to the secondary illumination apparatus thereby enabling the secondary illumination apparatus to adjust the intensity of the second directional illumination based upon the brightness control signal. Furthermore, the third interface may include a second mount for attaching the secondary illumination apparatus to the light illumination apparatus and directing the second directional illumination towards the object and a fourth connector for transmitting the brightness control signal and the power to the secondary illumination apparatus.

An imaging system comprises an external camera apparatus for receiving and digitizing an image of an object; a light illumination apparatus for illuminating the object; and a secondary illumination apparatus for illuminating the object, the light illuminating apparatus having: a first interface for receiving source power, and communicating a data stream with an external system controller, the data stream including a digital representation of an image of the object; a second interface for attaching an external camera apparatus to the light illumination apparatus to receive an image of the object, transmitting power to the external camera apparatus, and communicating data between the external camera apparatus and the external system controller including the digital representation of the image from the external camera apparatus; and a third interface for transmitting power to a secondary illumination apparatus having a second directional illumination, and mounting the secondary illumination apparatus to the light illuminating apparatus and direct the second directional illumination to illuminate the object.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various examples and to explain various principles and advantages all in accordance with the present description, in which.

DETAILED DESCRIPTION

Figure 1A:
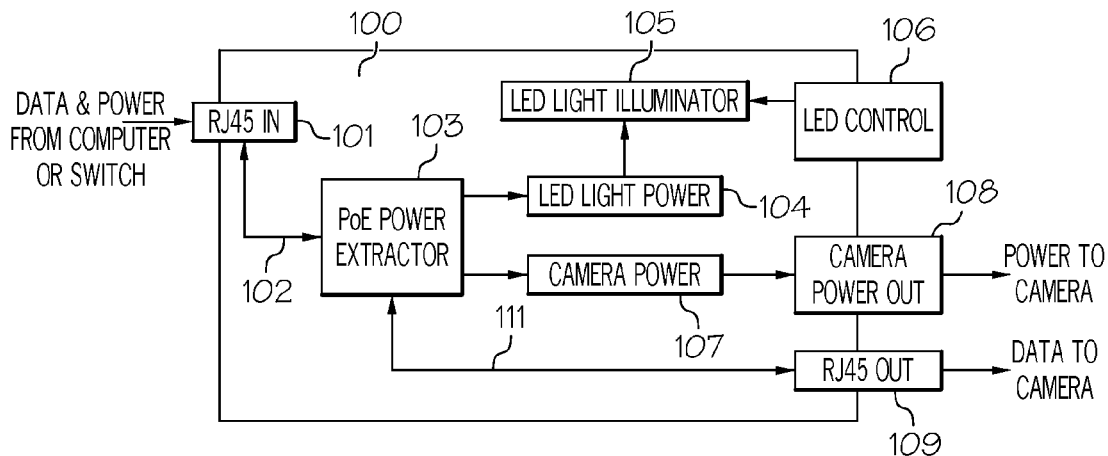
FIG. 1A and FIG. 1B show block diagrams of a light illumination apparatus where the interface between the computer and the camera is GigE with PoE.

As required, detailed examples are disclosed herein; however, it is to be understood that the materials disclosed are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure is presented for purposes of illustration, but is not intended to be exhaustive or limited in the form disclosed. Many modifications and variations will be apparent without departing from the scope of the description. The examples are chosen and described in order to best explain the principles of the description and the practical application, and to enable others to understand the description for various examples with various modifications as are suited to the particular use contemplated.

Accordingly, the present description provides an apparatus and method for light illumination where the power for the illumination device and the camera is provided directly from the power integrated into the data cable between the computer and the light illumination device.

In applications, where the camera-controller/host computer interface includes an integrated power and data stream such as GEV with PoE (see IEEE 802.3), Universal Serial Bus (USB) or CoaXPress (CXP), where a power is provided within the data interface cable, the distance between the camera and the computer may be very long. For convenience, any integrated power and data stream protocol may be collectively referred to generally as PoE in various references in this description. In order to avoid running multiple long cables to the camera and the light illumination apparatus, it is advantageous to combine a power extraction module with the light illumination apparatus. The power extraction module extracts the power from the integrated power and data stream and generates the individual powers for the light illuminator itself and the camera. In the case of GEV with PoE the maximum power transmitted via the network cable is 25 W, or 30 W in the case of the PoE plus standard. In case of a CXP, the maximum power transmitted via the coaxial cable is 15 W, and in case of USB 3.0 the power transmitted via the USB cable is 10 W. In all cases this power will be sufficient to supply the light illuminator and the camera. In cases where the interface standard do not provide integrated power, a power can be injected to the cable and extracted from the light illumination apparatus or provided directly to the light illumination apparatus by an auxiliary power source.

According to one example, the interface between the camera and the controller/host computer is GEV with PoE. The integrated power and data stream, transmitted via a single long network cable from the host computer with the standard GigE with PoE is received from the input RJ45 connector. The power extraction module senses the voltage from the computer and converts it to a DC voltage with a predetermined value—36 V for example. The actual value of the voltage depends on the particular camera and illuminator configuration. The data is transmitted directly to and output including a second RJ45 connector and sent to the camera via a short data cable. An illumination power module converts the incoming voltage from power extraction module to a voltage suitable for an LED illuminator—typically 24 V. The LED illuminator converts the incoming voltage to light with the means of at least one LED. The spectrum of the irradiated light depends on the particular application and can be UV, Visible or IR. An LED control connector provides an external signal which can modulate the light intensity by controlling the current flowing into LEDs, switching the ON or OFF, or using Pulse Width Modulation (PWM) approach. A camera power module converts the incoming voltage from the power extraction module to a voltage suitable for the camera operation—typically 12 V. The actual voltages generated by the different modules can be selected based on the particular application. The output voltage generated in camera module is supplied to the camera via a separate connector. In one example, the camera power module can serve as a PoE voltage injector and the camera voltage can be injected into the data signal thus forming a new PoE steam which will provide an integrated power and data to the camera.

FIG. 1A shows a block diagram of a light illumination apparatus where the interface between the computer and the camera is GigE with PoE. A first connector 101 is a RJ45 network connector and is attached to a light illuminator apparatus having a housing 100. A second connector 109 is a RJ45 network connector and is also connected to the light illuminator housing 100. A camera power output is available on a third connector 108 and a LED control connector 106 are also connected to the housing 100. In other examples, connectors 106 and 108 can share the same physical connector. A PoE (Power over Ethernet) extractor module 103 is connected form one side to the connector 101 via connection 102, and to a LED light power module 104, a camera power module 107, and to output connector 109 via connection 111. In some configurations the connection 102 and 111 can share the same connections. A LED Light illumination module 105, includes at least one LED and is connected to the LED power module 104 from one side and to the LED control connector 106. The LED module 105 is assembled in such way, that the LEDs are mounted on the housing 100 in such that their corresponding light emitting parts are facing outside of the housing. The individual LEDs in module 105 can be arranged in circular, linear or any other configuration, based on the particular application. The LED module 105 may comprise a constant current module to provide a constant current to the individual LEDs and thus to provide a constant illumination. The camera power module 107 is connected to the camera power output connector 108.

The integrated power and data stream, transmitted via a single network cable from the host computer with the standard GigE with PoE is received from connector 101. The power extraction module 103 senses the voltage from the integrated power and data stream and converts it to a DC source voltage with a predetermined value—36 V for example. The actual value depends on the particular camera and LED illuminator 105 configuration. The data is coupled directly to output connector 109 and sent to the camera. The LED power module 104 converts the incoming source voltage from module 103 to a voltage suitable for the LED Illuminator 105—typically 24 V. The LED Illuminator 105 converts the converted voltage to light with the means of at least one LED. The spectrum of the irradiated light depends on the particular application and can be UV, Visible or IR. The LED control connector 106 can provide an external signal which can modulate the light intensity by controlling the current flowing into LEDs, switching the LEDs ON or OFF, or using Pulse Width Modulation (PWM) approach to change the brightness. The camera power module 107 converts the incoming source voltage from module 103 to a voltage suitable for the camera operation—typically 12 V. In some configurations the modules 104 and 107 can be integrated in one module or directly integrated individually or together in the module 103. The actual voltages generated by the modules 103, 104 and 107 can be selected based on the particular application. The output voltage generated in module 107 is supplied to the camera via connector 109. In another example, the camera power module 107 can serve as a PoE voltage injector and the camera voltage can be injected into the data signal thus forming a second PoE steam which will provide an integrated power and data stream to the camera.

Figure 1B:
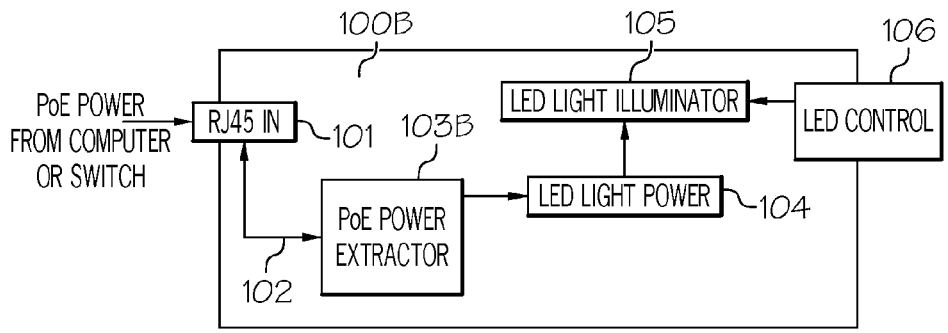

Since PoE may provide only 25 W of power ("PoE Plus" is only 30 W), in some light starved occasions the provided power from the PoE may not be enough to power the light and the camera. In such an example application the entire power from the PoE can be used for the LED and a camera can be powered separately form a second PoE port (if it is a PoE camera) or from an internal or independent power supply. In this example application, the camera power 107, camera out 108, and RJ45 out 109 elements of FIG. 1A may be optionally eliminated, as shown in FIG. 1B, thereby reducing the cost and number of connectors of the light illumination apparatus while providing additional power for illumination. In another example application the entire power from the PoE can be used for the LED and the camera can be powered separately form a second PoE port (if it is a PoE camera) or from an internal or independent power supply. In this example application, the camera power 107 and camera out 108, may be optionally eliminated. The RJ45 out 109 element of FIG. 1A remains and provides the data interface between the camera and the host computer.

FIG. 1B shows a block diagram of a light illumination apparatus where the interface between the apparatus and the computer or a network switch is GigE with PoE. First connector 101 is a RJ45 network connector and is attached to a light illuminator apparatus having a housing 100B. LED control connector 106 is also connected to the housing 100B. A PoE (Power over Ethernet) extractor module 103B is connected form one side to the connector 101 via connection 102, and to a LED light power module 104. A LED Light illumination module 105, includes at least one LED and is connected to the LED power module 104 from one side and to the LED control connector 106. The LED module 105 is assembled in such way, that the LEDs are mounted on the housing 100B in such that their corresponding light emitting parts are facing outside of the housing. The individual LEDs in module 105 can be arranged in circular, linear or any other configuration, based on the particular application. The LED module 105 may comprise a constant current module to provide a constant current to the individual LEDs and thus to provide a constant illumination. In some configurations module 103B and module 105 can be combined in one module.

The integrated PoE power transmitted via a single network cable from the host computer with the standard GigE with PoE (or a network switch) is received from connector 101. The power extraction module 103B senses the voltage from the integrated power and data stream and converts it to a DC source voltage with a predetermined value, 36 V for example. The actual value depends on the particular LED illuminator 105 configuration. The LED power module 104 converts the incoming source voltage from module 103B to a voltage suitable for the LED Illuminator 105, typically 24 V. In some configurations the module 103B and module 104 can be combined in the same module. The LED Illuminator 105 converts the converted voltage to light with the means of at least one LED. The spectrum of the irradiated light depends on the particular application and can be UV, Visible or IR. The converter 105 can have means to control the LED brightness via internal logic. The LED control connector 106 can also provide an external signal which can modulate the light intensity by controlling the current flowing into LEDs, switching the LEDs ON or OFF, or using Pulse Width Modulation (PWM) approach to change the brightness.

Figure 2:
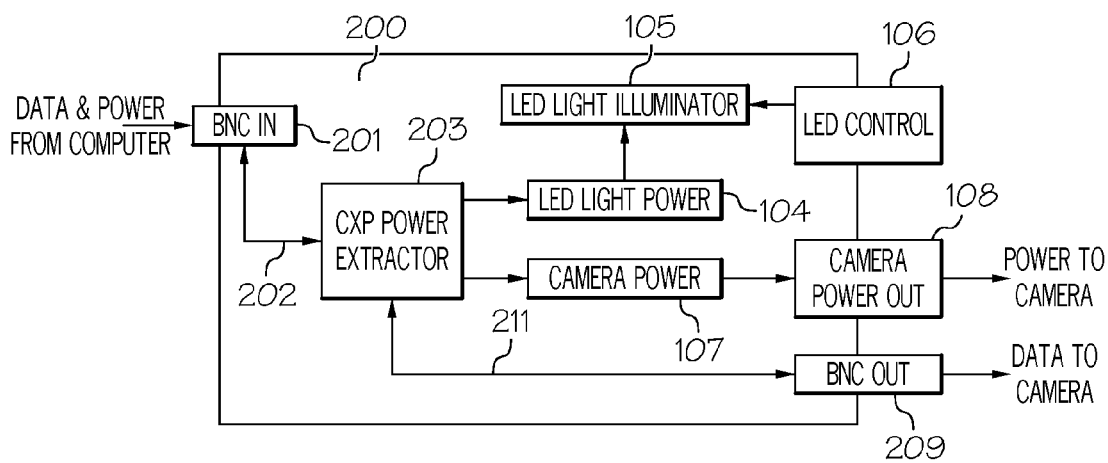
FIG. 2 shows a block diagram of a light illumination apparatus where the interface between the computer and the camera is CXP.

FIG. 2 shows a block diagram of a light illumination apparatus where the interface between the computer and the camera is CXP. FIG. 2 shows a modified example from of the structure of FIG. 1. In FIG. 2, like parts, which correspond to those in FIG. 1, are marked with the same reference numbers. In this example a first BNC connector 201 is connected to a light illuminator housing 200. A second BNC connector 209 is also connected to the light illuminator housing 200. A camera power connector 108 and a LED control connector 106 are also connected to the housing 200. Connectors 106 and 108 can share the same physical connector. A CXP (CoaXPress) extractor module 203 is connected form one side to the connectors 201 via connection 202, and to a LED light power module 204, a camera power module 107, and to an output connector 209 via connection 211. In some configurations the connection 202 and 211 can share the same connections. A LED Light illumination module 105, consisting of at least one LED is connected to the LED power module 204 from one side and to the LED control connector 106. The LED module 105 is assembled in such way, that the LEDs are mounted on the housing 200 so their corresponding light emitting parts are facing outside of the housing. The individual LEDs in module 105 can be arranged in circular, linear or any other configuration, based on the particular application. The LED module 105 may comprise a constant current module which is to provide a constant current to the individual LEDs and thus to provide a constant illumination. The camera power module 107 is connected to the camera power output connector 108.

The example of FIG. 2 operates similar to the description of FIG. 1. The integrated power and data stream, transmitted via a single coaxial cable from the host computer with the standard CXP is received from connector 201. The power extraction module 203 senses the voltage coming from the controller/computer and converts it to a DC source voltage with a predetermined value—24 V for example. The actual value depends on the particular camera and LED illuminator 105 configuration. The data is transmitted directly to output connector 209 and sent to the camera. The LED power module 204 converts the incoming source voltage from module 203 to a voltage suitable for the LED Illuminator 105—typically 20 V. The LED light illuminator 105 converts the converted voltage to light with at least one LED. The spectrum of the irradiated light depends on the particular application and can be UV, Visible or IR. The LED control connector 106 can provide an external signal which can modulate the light intensity by controlling the current flowing into LEDs, switching the ON or OFF, or using Pulse Width Modulation (PWM) approach. The camera power module 107 converts the incoming source voltage from module 203 to a voltage suitable for the camera operation—typically 12 V. In some configurations the modules 204 and 107 can be integrated in one module or directly integrated individually or together in the module 203. The actual voltages generated by the modules 203, 204 and 107 can be selected based on the particular application. The output voltage generated in module 107 is supplied to the camera via connector 209. In some configurations, the camera power module 107 can serve as a CXP voltage injector and the camera voltage can be injected into the data signal thus forming a new CXP steam which will provide a second integrated power and data stream to the camera.

Figure 3:
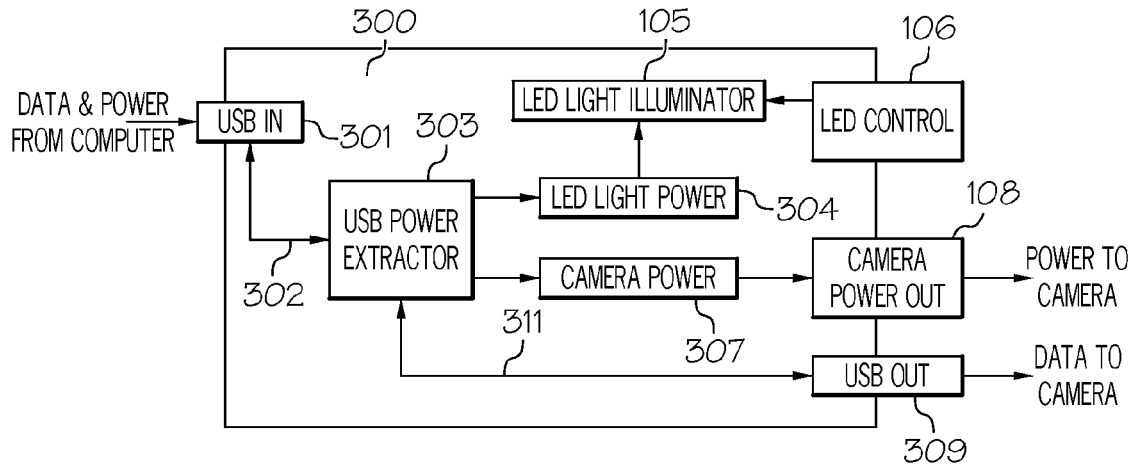
FIG. 3 shows a block diagram of a light illumination apparatus where the interface between the computer and the camera is USB.

FIG. 3 shows a block diagram of a light illumination apparatus where the interface between the computer and the camera is USB. FIG. 3 shows an example which is similar in structure to the block diagram shown in FIG. 1. In FIG. 3, like parts, which correspond to those in FIG. 1, are marked with the same reference numbers. In this modified design, a first USB connector 301 is connected to a light illuminator housing 300. A second USB connector 309 is also connected to the light illuminator housing 300. A third camera power connector 108 and a LED control connector 106 are also connected to the housing 300. Connectors 106 and 108 can share the same physical connector. A USB extractor module 303 is connected from one side to the connectors 301 via connection 302, and to a LED light power module 304, a Camera power module 307, and to an output connector 309 via connection 311. In some configurations the connection 302 and 311 can share the same connections. A LED Light illumination module 105, consisting of at least one LED is connected to the LED power module 304 from one side and to the LED control connector 106. The LED light illumination module 105 is assembled in such way, that the LEDs are mounted on the housing 300 so their corresponding light emitting parts are facing outside of the housing. The individual LEDs in module 105 can be arranged in circular, linear or any other configuration, based on the particular application. The LED module 105 may comprise a constant current module which is to provide a constant current to the individual LEDs and thus to provide a constant illumination. The camera power module 307 is connected to the camera power output connector 108.

The description according to FIG. 3 operates similar to the description of FIG. 1. The integrated power and data stream, transmitted via a single coaxial cable from the host computer with the standard USB is received from connector 301. The USB can be USB 2.0, USB 3.0, USB 3.0 Vision or any other USB standard. The power extraction module 303 senses the voltage coming from the computer and converts it to a DC source voltage with a predetermined value—5.0 V for example. The actual value depends on the particular camera and LED illuminator 105 configuration. The data is transmitted directly to output connector 309 and sent to the camera. The LED power module 304 converts the incoming source voltage from module 303 to a voltage suitable for the LED Illuminator 105—typically 24 V. The LED Illuminator 105 converts the converted voltage to light with the use of at least one LED. The spectrum of the irradiated light depends on the particular application and can be UV, Visible or IR. The LED control connector 106 can provide an external signal which can modulate the light intensity by controlling the current flowing into LEDs, switching the ON or OFF, or using Pulse Width Modulation (PWM) approach. The camera power module 307 converts the incoming source voltage from module 303 to a voltage suitable for camera operation—typically 12 V. In some configurations the modules 304 and 307 can be integrated into one module or directly integrated individually or together in the module 303. The actual voltages generated by the modules 303, 304 and 307 can be selected based on the particular application. The output voltage generated in module 307 is supplied to the camera via connector 309. In some configurations, the camera power module 307 can serve as a USB voltage injector and the camera voltage can be injected into the data signal thus forming a new USB steam which will provide an integrated power and data to the camera.

Figure 4:
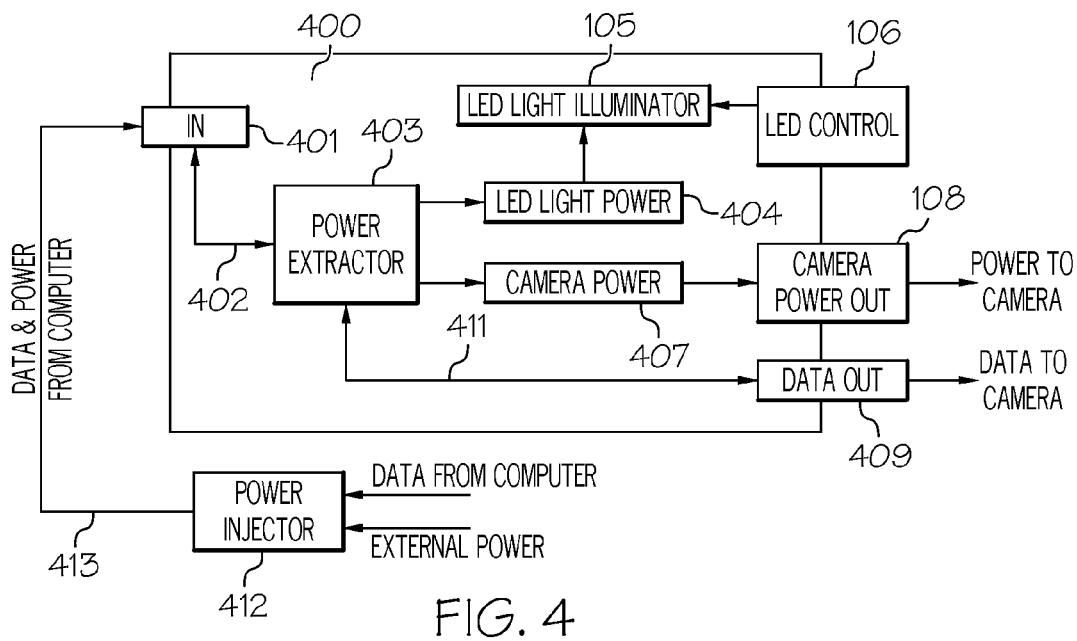
FIG. 4 shows a block diagram of a light illumination apparatus where the interface between the computer and the camera is generic integrated power and data stream.

FIG. 4 shows a block diagram of a light illumination apparatus where the interface between the computer and the camera is generic integrated power and data stream. FIG. 4 shows an example which is modified from and similar in structure to the description shown in FIG. 1. In FIG. 4, like parts, which correspond to those in FIG. 1, are marked with the same reference numbers. In this modified design a first connector 401 is connected to a light illuminator housing 400. A second connector 409 is also connected to the light illuminator housing 400. A camera power connector 108 and a LED control connector 106 are also connected to the housing 400. Connectors 106 and 108 can share the same physical connector. A power injection module 412, physically located outside of the illuminator housing 400 is connected to the first connector 401 via a cable 413. The power injector 412 has two inputs—one accepts the data from the host computer and the second accepts power from external power source. A voltage extractor module 403 is connected from one side to the connectors 401 via connection 402, and to a LED light power module 404, a Camera power module 407, and to an output connector 409 via connection 411. In some configurations the connection 402 and 411 can share the same connections. A LED Light illumination module 105, consisting of at least one LED is connected to the LED power module 404 from one side and to the LED control connector 106. The LED module 105 is assembled in such way, that the LEDs are mounted on the housing 400 so that their corresponding light emitting parts are facing outside of the housing. The individual LEDs in module 105 may be arranged in circular, linear or any other configuration, based on the particular application. The LED module 105 may include a constant current module that provides a constant current to the individual LEDs and thus provides a constant illumination brightness. The camera power module 407 is connected to the camera power output connector 108.

The example of FIG. 4 operates similar to the example of FIG. 1. The data from the controller/host computer is integrated with the external power in power injector 412 and the newly integrated power and data stream, transmitted via the cable 413 is received at connector 401. The data can be any standard or non-standard interface such as Analog, Camera link, GigE, FireWire (IEEE 1394), or any other data protocol. The power extraction module 403 senses the voltage coming from the computer and converts it to a DC source voltage with a predetermined value—28V for example. The actual value depends on the particular camera and LED illuminator 105 configuration. The data is transmitted directly to output connector 409 and sent to the camera. The LED power module 404 converts the incoming source voltage from module 403 to a voltage suitable for the LED Illuminator 105—typically 24 V. The LED Illuminator 105 converts the converted voltage to light with at least one LED. The spectrum of the irradiated light depends on the particular application and can be UV, Visible or IR. The LED control connector 106 can provide an external signal which can modulate the light intensity by controlling the current flowing into LEDs, switching the ON or OFF, or using Pulse Width Modulation (PWM) approach. The camera power module 407 converts the incoming source voltage from module 403 to a voltage suitable for the camera operation—typically 12 V. In some configurations the modules 404 and 407 can be integrated in one module or directly integrated individually or together in the module 403. The actual voltages generated by the modules 403, 404 and 407 can be selected based on the particular application. The output voltage generated in module 407 is supplied to the camera via connector 409. In some configurations, the camera power module 407 can serve as a voltage injector and the camera voltage can be injected into the data signal thus forming a new power and data steam which will provide an integrated power and data stream to the camera.

Possible modifications to the description herein include an example where The LED Light illuminator can comprise of LEDs with similar or different spectrum of irradiation. The LEDs can be arranged in one or several circular patterns, one or several linear patterns or any arbitrary arrangement. The light illumination module 105 can include similar or different light emitting devices, such as light bulbs, laser sources, gas discharge tubes, fluorescent tubes, or any other light emitting devices. The LED control may be omitted or integrated into the data stream. The LED control may be wire or wireless—using Wi-Fi wireless, Bluetooth, optical, RF or other wireless means. The Power extractor module, the LED Light power module and the Camera power module may be integrated in one or two modules, depending on the application. The Camera power connector, the LED control connector, the Data in connector, the Data out connector may be integrated in or more connectors. Furthermore, the connectors described herein may be any type of connector, including removable plugs and sockets at ends of cables, electronic, magnetic and/or optical interfaces at ends of cables and soldering of cable wiring directly to circuit boards.

The description herein also includes a light illumination apparatus where the power for the illumination device and the camera is provided directly from the power integrated into the data input cable between the computer and the light illumination device. The light illumination apparatus includes at least one input connector to accept the first integrated power and data steam, at least one output connector to provide the second data and power stream to the camera, a light illumination module comprising of at least one light emitting device, a power extraction module to separate the power and the data and to convert the power to the appropriate voltage for the camera and the light illumination module. The first data steam may be GigE with PoE, CXP or USB. The power extraction module may include a camera power module to provide the required voltage to the camera and a light power module to provide the required voltage to the said light illumination module. The light emitting device may be LED, light bulb, laser, gas discharge tube, fluorescent tube, or any other light emitting device. The light emitting device irradiates in the Visible, UV or IR spectral regions. The light emitting devices in the said light illumination module may be arranged in at least one circular, linear or any arbitrary pattern. The light illumination module has a capabilities to control the intensity of said light emitting devices, and the control of the intensity of the said light emitting devices may be provided via wire or wireless—using Wi-Fi wireless, Bluetooth, optical, RF or other wireless means. The output connector may comprise at least one data connector to provide the data to the camera and at least one power connector to provide the power to the camera. And a method for powering the light illuminator using the power provided from the data stream is presented in the description.

Figure 5:
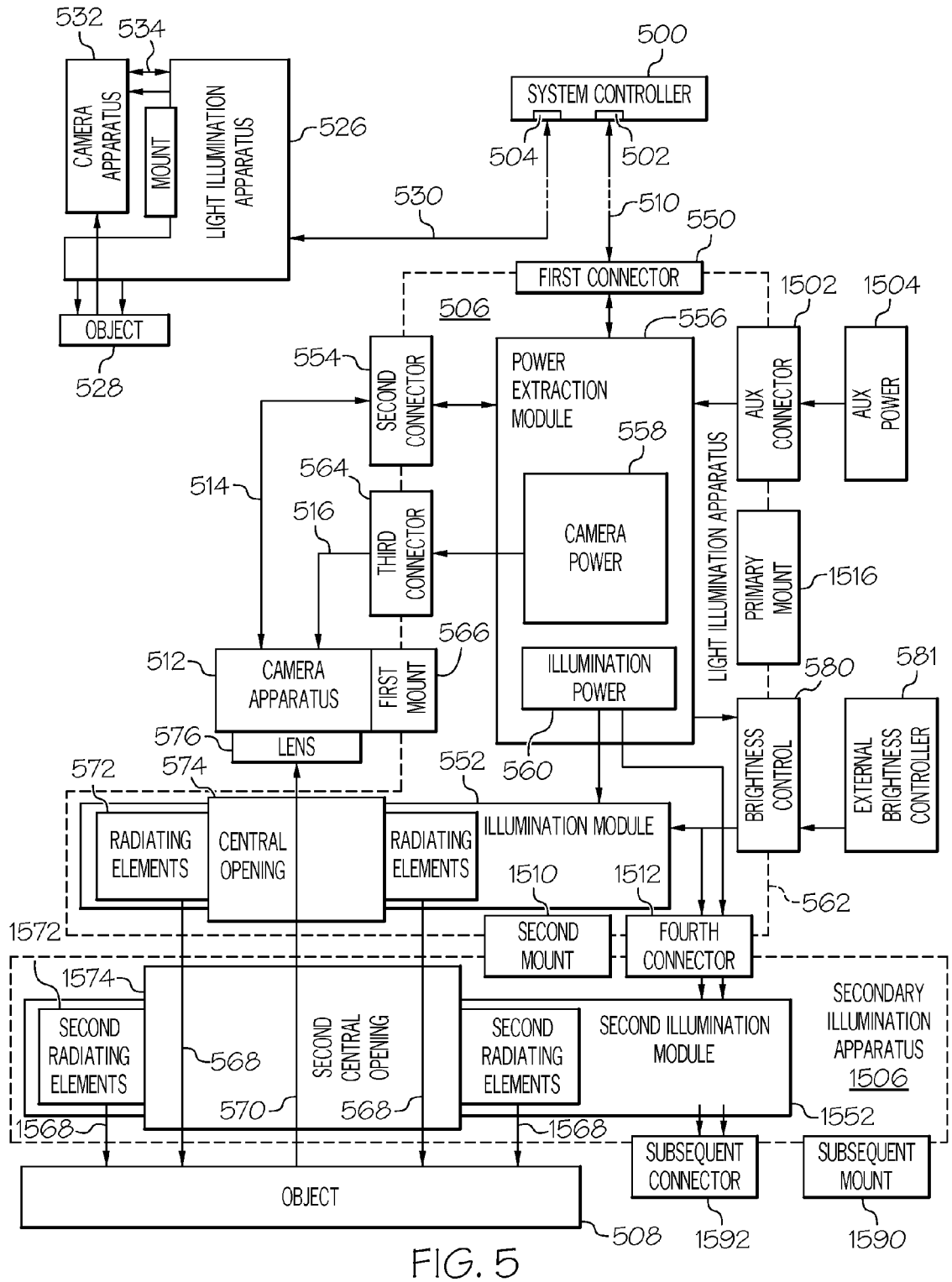
FIG. 5 shows a block diagram of a system including an external controller, a plurality of light illumination apparatuses and a plurality of external cameras.

FIG. 5 shows a block diagram of a system including an external controller, a plurality of light illumination apparatuses and a plurality of external camera apparatuses. An external controller 500 has a first controller connector 502 having a first integrated power and data stream which may be a GigE with PoE, CXP, USB or other integrated data and power stream, and a second controller connector 504 having a second integrated power and data stream.

A first light illumination apparatus 506 is coupled to the first controller connector 502 and adapted to illuminate a first object 508 by consuming a first portion of first power received from the first integrated power and data stream, and to generate a first camera power by consuming a second portion of first power received from the first integrated power and data stream. A first long cable 510 connects the first integrated power and data stream between the first controller connector 502 and the first light illumination apparatus 506. The first long cable may have a length up to and/or exceeding 100 meters. A first camera apparatus 512 is coupled to the first light illumination apparatus 506 and generates a digitized first image of the first object 508 illuminated by the first light illumination apparatus 506 by consuming the first camera power received from the first light illumination apparatus. A first short data cable 514 couples a first data stream component of the first integrated power and data stream between the first camera apparatus 512 and the first light illumination apparatus 506. The first camera apparatus 512 modulates the digitized first image upon the first data stream component for communication to the external controller 500. A first short power cable 516 couples the first camera power from the first light illumination apparatus to the first camera apparatus. In one example, the first short data cable and the first short power cable may have a length of 0.25 meters, thus the length of the first long cable is at least one hundred times greater, if not four hundred times greater than the length of the first short power cable.

A second light illumination apparatus 526 is coupled to the second controller connector 504 and adapted to illuminate a second object 528 by consuming a first portion of second power received from the second integrated power and data stream, and to generate a second camera power by consuming a second portion of second power received from the second integrated power and data stream. A second long cable 530 connects the second integrated power and data stream between the second controller connector 504 and the second light illumination apparatus 526. The second long cable may have a length of up to and/or exceeding 100 meters. A second camera apparatus 532 is coupled to the second light illumination apparatus 526 and generates a digitized second image of the second object 528 illuminated by the second light illumination apparatus 526 by consuming the second camera power received from the second light illumination apparatus. A second short data cable 534 couples a second data stream component of the second integrated power and data stream between the second camera apparatus 532 and the second light illumination apparatus 526. The second camera apparatus 532 modulates the digitized second image upon the second data stream component for communication to the external controller 500. A second short power cable 536 couples the second camera power from the second light illumination apparatus to the second camera apparatus. In one example, the second short data cable and the second short power cable may have a length of 0.20 meters, thus the length of the second long cable is at least one hundred times greater, if not five hundred times greater than the length of the second short power cable. In another example the length of a long cable 510 or 530 may be a standard one meter USB cable with a short cable 514, 516, 534 or 536 being as long as a quarter of a meter. In this example the length of a long cable is a little as four times (or more) greater than the length of a long cable. In another example the length of a long cable 510 or 530 may be a standard two meter USB3, CXP or GEV cable with a short cable 514, 516, 534 or 536 being standard 0.3 meter cable. In this example the length of a long cable is a six and two thirds times greater than the length of a long cable. Thus, in these examples, the length of a long cable is substantially greater than the length of a short cable with a long cable being between four and five hundred times longer than the length of a short cable.

The system of FIG. 5 shows two light illumination apparatuses coupled to two camera apparatuses. Cables 510 and 530 may be 100 meters in length, thus the two light illumination apparatuses coupled to two camera apparatuses may be separated by a distance between 100 meters and 200 meters, corresponding to a distance exceeding one hundred meters in a manufacturing or other environment, depending upon the implementation of the manufacturing environment. The distance between the two light illumination apparatuses coupled to two camera apparatuses may depend upon the length of cables 510 and 530, and the distance may be at most the total length of cables 510 and 530. Nevertheless, the arrangement allows for the first light illumination module is separated from the second light illumination module by a distance exceeding the length of the shorter of the first long cable and the second long cable. For example, the length of the first long cable is 10 meters and the length of the second long cable is twenty meters, the system allows for the distance between the two light illumination apparatuses coupled to two camera apparatuses to exceed ten meters, which is the length of the first long cable, the first long cable being the shorter of the first long cable and the second long cable. In another example, only one light illumination/camera apparatuses may be coupled to the controller. In other examples, three or more light illumination/camera apparatuses may be coupled to the controller, each light illumination/camera apparatuses coupled to the controller with a single long cable. The system shows a potential advantage of eliminating two of three long cables between the controller and each light illumination/camera apparatus. A first of the three long cables would provide power from the controller to the light illumination apparatus, a second of the three long cables would provide power from the controller to the camera apparatus, and a third of the three long cables would communicate a data stream between the camera apparatus and the controller.

FIG. 5 also shows details of a components of a light illumination apparatus 506. A first connector 550 is configured to receive an integrated power and data stream from an external controller, the integrated power and data stream having a source power component at a source voltage combined with a data stream component on a conductor of the first connector. For example, a CXP integrated power and data stream may include both the source power and the data stream component on a single center conductor of the first coax connector. In another example, a GigE with PoE integrated power and data stream may include both the source power and the data stream component on a multiple contacts of an RJ45 connector. Illumination module 552 generates light upon receiving a first power component at a first voltage and may correspond to illumination module 105. A second connector 554 communicates the data stream component with the external camera apparatus 512 for modulating the data stream component with a digital representation of a received image upon receiving operating power from a second power component.

Power extraction module 556 may be functionally similar to modules 103, 203, 303 and 403, and is coupled to the first connector 550, the second connector 554, and the illumination module 552. The power extraction module 556 extracts the source power component from the integrated power and data stream, and the data stream component from the integrated power and data stream, and communicates the data stream component between the first connector 550 and the second connector 554. Additionally, power extraction module 556 includes camera power module 558 which may be functionally similar to modules 107, 307, and 407 and functions to convert a first portion of the source power component to the first power component at the first voltage, and then provides the first power component to the illumination module. Additionally power extraction module 556 includes an illumination power module 560 which may be functionally similar to modules 104, 204, 304, and 404. Illumination power module 560 supplies a second portion of the source power component to the second power component, and provides the second power component to the external camera apparatus 512. In one example, modules 558 and 560 may be at least partially comprised within a common power conversion integrated circuit. Also illumination power module 560 may provide a regulated current source for illumination module 552 wherein the second voltage produced by the illumination power module is a function of the regulated current source and the electrical load of the illumination module.

Light illumination apparatus 506 is housed within a housing 562 which houses the first connector 550, the illumination module 552, the second connector 554, and the power extraction module 556.

In one example implementation (not shown), the power extraction module 556 is further adapted to combine the second power component with the data stream component via the camera power module 558 to produce a second integrated power and data stream, and provide a second integrated power and data stream to the second connector 554, thereby providing the data stream component and the second power component to the external camera apparatus through the second connector 554.

In the example implementation shown in FIG. 5, the light illumination apparatus 506 further includes a third connector 564 housed by the housing 562 and coupled to the camera power module 558 of the power extraction module 556, wherein the second power component is provided to the external camera apparatus 512 through the third connector 564. The power extraction module further supplies the second portion of the source power component to the second power component by converting the second portion of the source power component to the second power component at a second voltage, wherein the source voltage is different from the first voltage and the second voltage, and the second voltage is different from the first voltage.

The housing 562 further includes a mount 566 adapted to removably affix the external camera apparatus 512 to the light illumination apparatus 506. The mount may be any approach to removably attaching the external camera apparatus 512 to the light illumination apparatus 506 while remaining within the scope of this description and may include interlocking surfaces and fasteners known to those familiar with the art. The illumination module 552 generates light which radiates in a radiation direction 568. The external camera apparatus 512 captures images received in a viewing direction 570. The mount 566 aligns the radiation direction 568 and the viewing direction 570. This arrangement not only provides for improved illumination and capturing of images by assuring alignment of the radiation and viewing directions, but also fixes distances between the camera apparatus 512 and the second and third connectors 554 and 564. Contrary to long distance routing of cable 510, the fixed distances allow for cables 514 and 516 to be made predictable short.

The illumination module 552 includes a multiplicity of regularly arranged light radiating elements 572 having an aperture or central opening 574 and the external camera apparatus 512 has a lens 576 for receiving images, The mount 566 positions the lens 576 in the central opening 574. In one example, the multiplicity of light radiating elements 572 are organized into a circular arrangement and the central opening 574 corresponds to at a center of the circular arrangement. In another example, the multiplicity of light radiating elements 572 are organized into a linear arrangement such as one or more rows of radiating elements, and the central opening corresponds to one of a center of the linear arrangement and a perpendicular offset from the center of the linear arrangement. Thus the rows of elements may have a central opening for accepting the lens, or the rows of elements may be continuous and the central opening located at the center of the length of the rows but perpendicularly offset beyond the rows thereby allowing the rows to comprise regularly spaced lighting elements. Other arrangements of lighting elements may be utilized while remaining within the scope of this description.

In another example implementation, the light illumination apparatus is able to provide camera power both at the third connector 564 and as a second integrated power and data stream at second connector 554. This implementation has the potential advantage of enabling the light illumination apparatus to interface to a variety of different camera apparatuses while interfacing with the controller using a single long cable 510. For example a first camera apparatus may have a single connector for accepting an integrated power and data stream separate data stream while a second camera apparatus may have a one connector for accepting power and another connector for accepting the data stream. Either camera apparatus may be readily installed or replaced (if defective for example) in a production or manufacturing environment well after the light illumination module 506 has been installed and the long cable 510 routed through the production environment. Thus, if the first camera apparatus fails, it may be quickly replaced with the second camera apparatus without having to route additional power cabling through the production environment for the second camera.

In this example of the light illumination apparatus, the second power component has a first element having a first element voltage corresponding to the source voltage and a second element having a second element voltage different from the source voltage, and the power extraction module further combines the first element of the second power component with the data stream component to produce a second integrated power and data stream, and apply the second integrated power and data stream to the second connector 554, thereby providing the second power component to the external camera apparatus through the second connector. Furthermore, the illumination apparatus further comprises the third connector 564 housed by the housing 562 and coupled to the power extraction module 556 wherein the second element of the second power component is available to the external camera apparatus through the third connector 564, and the power extraction module further supplies the second portion of the source power component to the second element of the second power component by converting the second portion of the source power component to the second power component at a second voltage. The source voltage may be different from the first voltage and the second voltage, and the second voltage is different from the first voltage. This arrangement enables provision of the second power component to the external camera either through the second connector at the source voltage or the third connector at the second voltage.

Examples of the light illumination apparatus include any format of the integrated power and data stream including one of GigE with PoE, CXP, and USB. Furthermore, the illumination module includes an at least one illumination element for converting the first power component into light, the at least one illumination element comprised of one of an LED, an incandescent light bulb, a laser, a gas discharge tube, and a fluorescent tube. The illumination module includes an at least one illumination element for converting the first power component into light, wherein the light is included within at least one of an infrared spectrum, a visible spectrum and an ultraviolet light spectrum.

The light illumination apparatus 506 further comprises an illumination brightness controller 580 coupled to the illumination module 552 and able to adjust a brightness of the light generated by the illumination module based upon a brightness signal. The illumination brightness controller 580 may be functionally similar to LED control 106 and may include at least one of a manual input device including one of: a switch, a plurality of switches and a rotary knob for receiving the brightness signal based upon a manual input; a wireless module including one of a RF module, a WiFi module and a Bluetooth module for receiving the brightness signal based upon a wireless signal from an external brightness controller; and a connector including one of for receiving the brightness signal based upon one of a wired signal and an optical signal received from the external brightness controller. In other examples the bright signal for the brightness controller 580 may be received from controller 500 through the first connector 550, or from the external camera apparatus 512 through the second connector 554 or the third connector 564, or an external brightness controller 581 adapted to regulate the amount of illumination of the object. Other methods of generating and or receiving a brightness signal and adjusting brightness are considered to be within the scope of this description.

Figure 6:
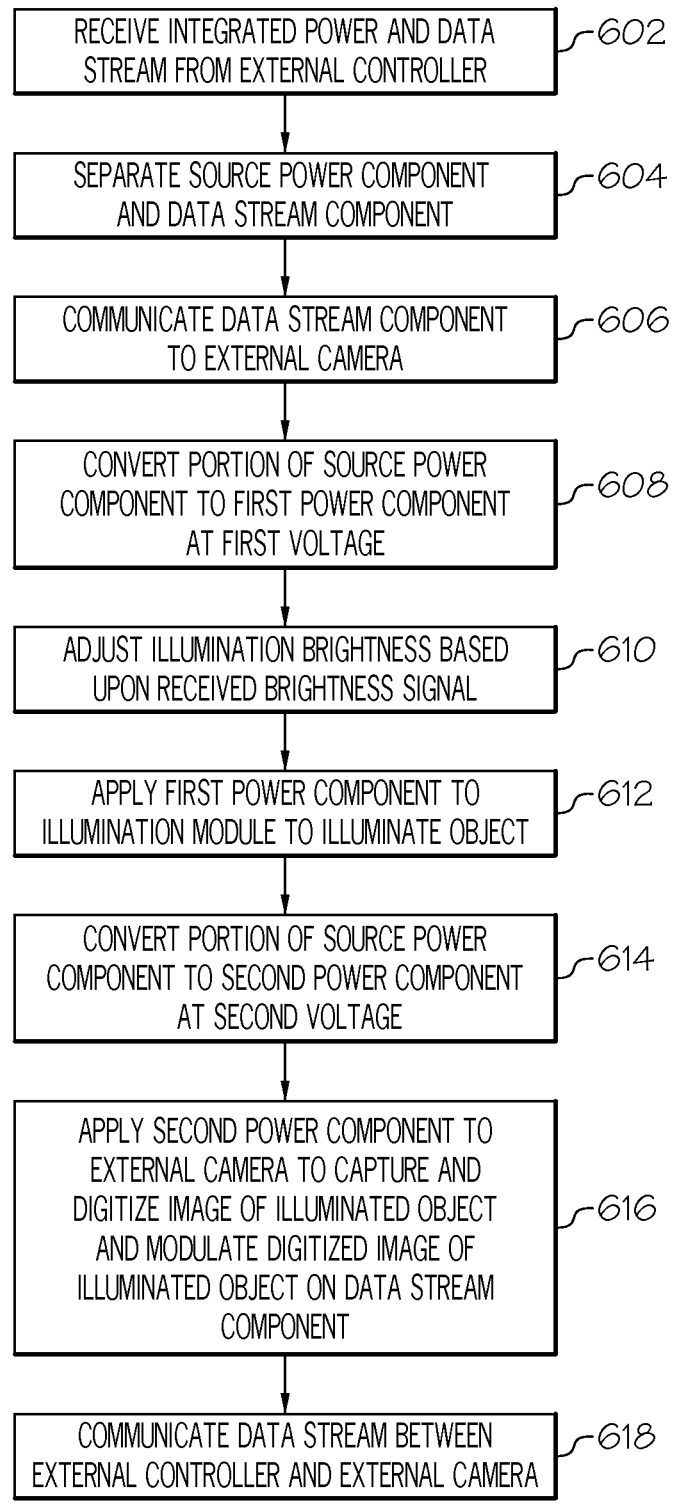
FIG. 6 shows an example flow diagram of a process operating within a light illumination apparatus with integrated power provision.

FIG. 6 shows an example flow diagram of a process operating within a light illumination apparatus with integrated power provision. The method is performed within the housing of the light illumination apparatus. At step 602, the method receives an integrated power and data stream from an external controller at a first connector of the light illumination apparatus. The format of the integrated power and data stream includes one of GigE with PoE, CXP, and USB, of other integrated power and data stream approach. The integrated power and data stream has a source power component at a source voltage and a data stream component. The source power component and the data stream component are integrated are present on a conductor of the first connector. At step 604, the method separates the source power component and the data stream component from the integrated power and data stream. At step 606 the method communicates the data stream component to a second connector for coupling the data stream component to an external camera apparatus. At step 608 the method converts a first portion of the source power component to a first power component at a first voltage, and applies the first power component to an illumination module for illuminating an object at step 612. The illumination brightness may be adjusted based upon a received brightness signal at step 610. Step 614 of the method converts a second portion of the source power component to a second power component at a second voltage different from the first voltage and different from the source voltage and applies the second power component to the external camera apparatus at step 616. The external camera apparatus is able to receive an image of the object, produce a digitized image of the object, and modulate the digitized image of the object upon the data stream component. At step 618 the method communicates the data stream component including the digitized image of the object from the second connector to the first connector.

As previously described, one example of the method allow for combining the second power component with the data stream component to generate a second integrated power and data stream, wherein the communicating the data stream component to the second connector includes coupling the second integrated power and data stream to the external camera apparatus.

In another previously described example of the method, the light illumination apparatus further comprises a third connector, and the providing further includes applying the second power component to the third connector for coupling the second power component to the external camera apparatus. Furthermore, the method optionally allows for combining the second power component with the data stream component to generate a second integrated power and data stream, wherein the communicating the data stream component to the second connector includes coupling the second integrated power and data stream to the external camera apparatus, thereby providing camera power on both the second connector as a second integrated power and data stream and the third connector as the second power component. This allows a light illumination apparatus to interface to either a camera that accepts an integrated power and data stream on a single connector, or a separate power component on one connector and a separate data stream on another connector thereby providing the potential advantage of increasing a flexibility of implementing and or maintaining a vision based manufacturing or production system.

Potential benefits of the present description include providing a light illumination apparatus that facilitates a single long cable from an external controller to illumination and camera apparatuses utilizing a short power cable and a short data cable between the light illumination apparatus and the external camera apparatus. Since the camera apparatus is external to the light illumination apparatus, a desired camera apparatus may be configured with any of several types of light illumination apparatuses. The light illumination element configuration (circular, linear or otherwise) and spectrum (infrared, visible or ultraviolet) associated with the external camera element may be adjusted to the application of the camera and manufacturing application by selecting and installing a desired light illumination apparatus, while maintaining the potential benefit of reduced cabling requirements. Furthermore for cameras that do not support integrated power and data stream cabling, the light illumination apparatus functions to convert an integrated power and data stream communicated through a long cable to a separate data stream and a separate power component communicated through short cables, thereby adapting the camera to the integrated power and data stream application while providing for illumination of objects recorded by the camera and supporting a single long cable from the controller/host computer. Furthermore, the light illumination apparatus has a mount that advantageously locates the lens of the external camera relative to the illumination module, for example in the central opening of a circular illumination module.

Referring back to FIG. 5, FIG. 5 also show a secondary illumination apparatus 1506. The secondary illumination apparatus 1506 may be a non-PoE or other type of passive light emitting device which does not require a power extraction module or a brightness control. It may be in the shape of a ring, linear bar or other shape which may receive power from the light illumination apparatus 562 and/or be mounted to the light illumination apparatus 506. This configuration has the potential advantage of simplifying the power connections to both the camera apparatus 512 and the secondary illumination apparatus 1506 because power may only need to be provided to the light illumination apparatus 506. The power may be provided through PoE via cable 510 or through an auxiliary connector 1502 coupled to an auxiliary power supply 1504. This configuration has the further potential advantage of simplifying the mounting to of the camera apparatus 512 and the secondary illumination apparatus 1506 because they may both be mounted to the light illumination apparatus 506 in order to better illuminate and capture images of the object 508. The light illumination apparatus itself need only a single primary mount for attachment to a device such as, a manufacturing line, coupled to the object being recorded by the camera apparatus to facilitate stable imaging recording of the object. The light illumination apparatus thus facilitates mounting and alignment of the camera apparatus and the secondary illumination apparatus.

Furthermore, the use of multiple subsequent illumination apparatuses coupled to the secondary illumination apparatus allows for the creation of a longer linear bar or a bigger ring by stacking together several bars, several rings or mixing different shapes. The linear bars or rings may be stacked or concatenated in a linear or circular fashion to realize any number of two dimensional or three dimensional shapes. In various examples, the light illumination apparatus may be configured to operate as a secondary illumination apparatus, or the secondary illumination apparatus may be configured to provide power and mounting to the camera apparatus. In a non-PoE implementation, the secondary illumination apparatus may allow for the illumination of the light illumination apparatus. PoE and non-PoE extensions may be mixed. In either a PoE or a non-PoE implementation the brightness may be controlled by either the camera or other brightness control.

Light illumination apparatus 506 further includes a second mount 1510 for detachably securing the secondary illumination apparatus to the primary light illumination apparatus. A fourth connector provides operating power and a brightness control signal to the secondary illumination apparatus. The brightness control signal may be identical or different from the brightness control signal provided to the illumination module 552. In one example the brightness control signal provided on connector 1512 may be a PWM signal independent of the power provided to the secondary illumination apparatus, in another example, the PWM signal may be combined with the power provided to yield a PWM power signal, thereby producing a combined power and brightness signal to the secondary illumination apparatus. In other examples, the brightness control signal may regulate the voltage or current provided to the secondary illumination apparatus. The operating power may be converted from the source power component from either the PoE or auxiliary power connectors and converted to an appropriate voltage by the power extraction module 556. The converted power may be provided by a power converter common to both the illumination module 552 and the secondary illumination apparatus or may be provided by an independent power converter and further may have a voltage that is either the same different from the voltage provided to the illumination module 552, depending upon the desired application. In another example, the operating power may be provided to the secondary illumination apparatus through an auxiliary power source, such as source 1504, wherein any power made available through connector 1512 would be optional.

The secondary illumination apparatus 1506 includes a second illumination module 1552 having one or more second radiating elements 1572 which may be functionally similar to illumination module 552 and radiating elements 572 and have a radiation direction 1568. The secondary illumination apparatus also includes a subsequent mount 1590 and a subsequent connector 1592 for mounting and powering subsequent illumination modules. Subsequent mount 1590 and subsequent connector 1592 may be functionally and mechanically similar to second mount 1510 and second connector 1512.

In one example, the secondary illumination apparatus 1506 may be a duplicate light illumination module 506 with several elements either unused, deactivated, disconnected or removed. Such elements include the power extraction module 550, the first connector 550, the second connector, 554, the third connector 564, the brightness control 580 and the primary mount 1516. In other examples, various elements may be retained or utilized depending upon the application, for example, the first mount may be retained to mount the camera apparatus on the secondary illumination apparatus.

In an example of ring shaped illumination devices, illumination module 552 of the light illumination apparatus 506 is circularly shaped and has a central opening 574 adapted to accept a lens 576 of camera apparatus 512. Similarly, the second illumination module of the secondary illumination apparatus 1506 also is circularly shaped and has a second central opening 1574 adapted to accept the illumination module 552. In this example light from second illumination module 1552 illuminates the object 508. Light from the illumination module 552 passes through the second central opening 1574 to further illuminate the object 502. Light from the object 502 passes through both the second central opening 1574 and the central opening 574 to be received by the camera lens 576 in order to be recorded by the camera apparatus 512.

In accordance with the example of FIG. 1B wherein the camera apparatus 512 is independently powered either via internal power, or external power (via auxiliary power module 1504 or a second PoE line), the power component of the integrated power and data received on corresponding first connector 550 may be applied entirely for illumination. Accordingly, camera power module 550 and third connector 516 may optionally be eliminated. Furthermore, if a data coupling through the light illumination apparatus is not required, because a data is internally stored or a separate PoE for the camera apparatus is provided for example, then connector 554 may also be optionally eliminated. Nevertheless, the first mount may be retained thereby enabling alignment of the directional light of the light illumination apparatus and/or the secondary illumination apparatus to enhance illumination of the object 508 for recording by the camera apparatus.

Figure 7:
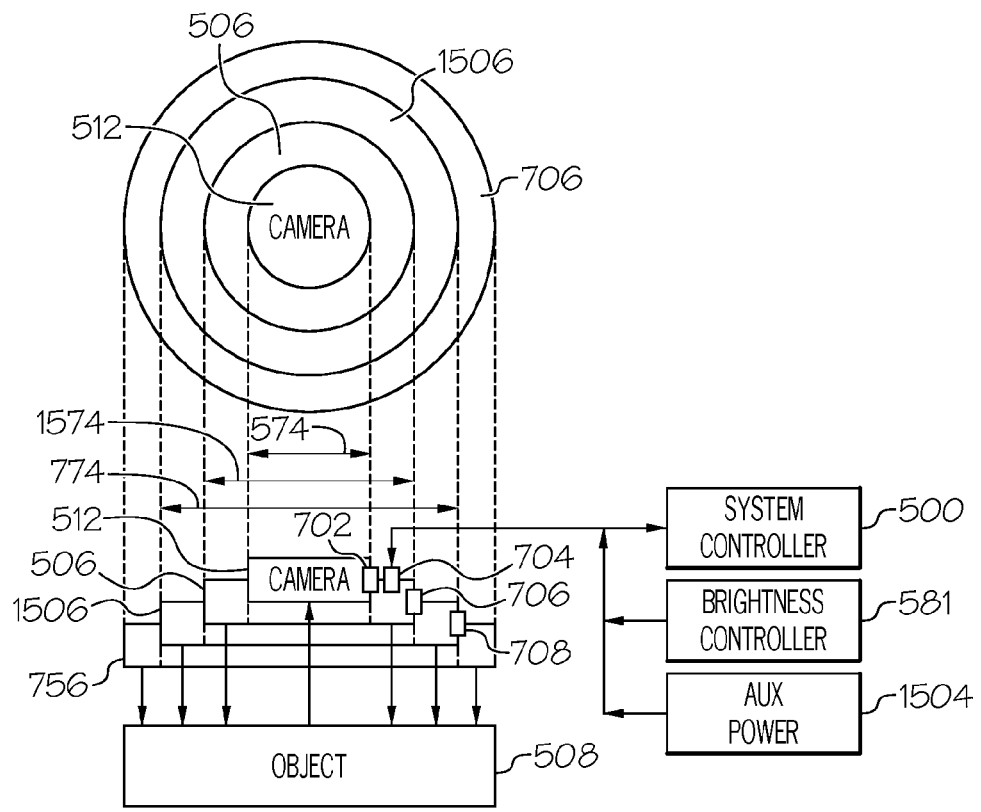
FIG. 7 shows an example of a light illumination apparatus in a circular system application.

FIG. 7 shows an example of a light illumination apparatus in a circular system application. With reference to FIG. 7 and FIG. 5, light illumination apparatus 506 comprises an illumination module 552 having a directional illumination for illuminating an object 508, a first interface 704 for receiving source power, and communicating a data stream with a system controller 500, the data stream including a digital representation of an image of the object. The first interface 704 includes a primary mount 1516 for removably attaching the light illumination apparatus 508 to a device such as a manufacturing line which is coupled to the object 508, the primary mount 1516 also provides for directing the directional illumination towards the object. In one example, the first interface includes a first connector 500 for receiving an integrated power and data stream from the system controller, the integrated power and data stream having the source power combined with the data stream on a conductor of the first connector. In another example, the first interface 704 includes a first connector 550 for communicating the data stream with the system controller and an auxiliary connector 1502 for receiving the source power from an auxiliary power source.

The light illumination apparatus 506 further comprises a second interface 702 for attaching the camera apparatus 512 to the light illumination apparatus 506 to receive the image of the object, transmitting power to the camera apparatus, and communicating the data stream with the camera apparatus. The second interface 702 includes a first mount 566 for attaching the camera apparatus 512, lens 576 or other component affixed to the camera apparatus 512 to the light illumination apparatus 506 and directing the camera apparatus 512 to receive the image of the object 508 and at least a second connector 554 for transmitting the power to the camera apparatus 512 and communicating the data stream with the camera apparatus.

The light illumination apparatus 506 further comprises a third interface 706 for transmitting power to a secondary illumination apparatus 1506 having a second directional illumination, and mounting the secondary illumination apparatus to direct the second directional illumination to illuminate the object 506. The third interface 706 includes a second mount 1510 for attaching the secondary illumination apparatus 1506 to the light illumination apparatus 506 and directing the second directional illumination towards the object 508. The third interface also includes a fourth connector 1512 for transmitting the power to the secondary illumination apparatus 1506 and for transmitting power to a subsequent illumination apparatus 756. The secondary illumination apparatus may include a fifth interface 708 including a subsequent connector 1592 for transmitting power to a subsequent illumination apparatus 756. The fourth connector 1512 may further transmit the brightness control signal and the power to the secondary illumination apparatus. The fifth interface may also include a subsequent mount 1590 for attaching the subsequent illumination apparatus 756 to the secondary illumination apparatus 1506 and directing illumination from the subsequent illumination apparatus 756 towards the object 502. The light illumination apparatus 506 further comprising a brightness control interface 580 for receiving a brightness control signal wherein the light illumination apparatus 506 adjusts the intensity of the directional illumination based upon the brightness control signal, and the third interface 706 further communicates the brightness control signal to the secondary illumination apparatus 756 thereby enabling the secondary illumination apparatus to adjust the intensity of the second directional illumination based upon the brightness control signal.

Figure 8:
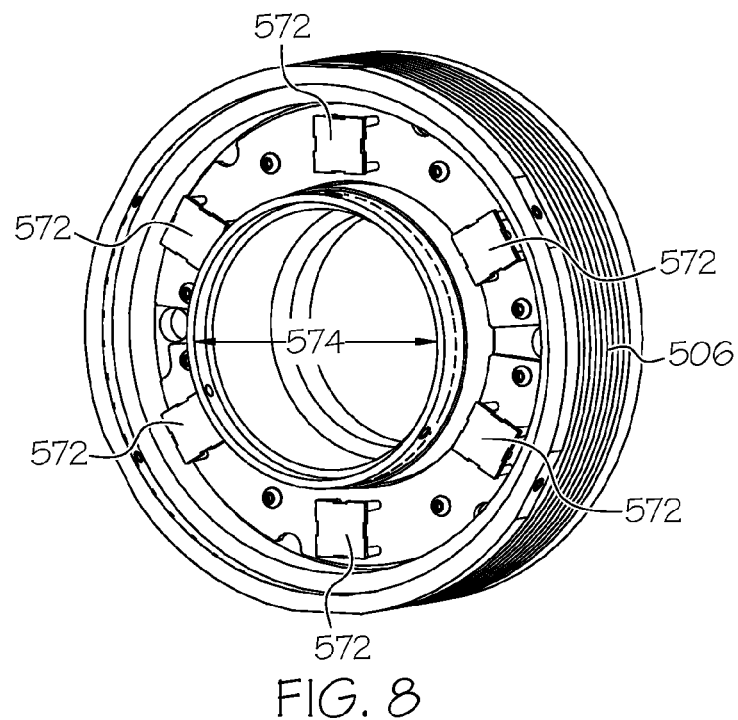
FIG. 8 shows an example of a perspective view of a light illumination apparatus for a circular system application.

The light illumination apparatus of FIG. 7 and FIG. 8 shows that the light illumination apparatus 506 has a substantially circular shape having a first radius and a central opening 574. The first mount 566 is adapted to position the lens 566 within the central opening 574. The secondary illumination apparatus 1506 may be substantially circular includes a second central opening 1574 larger than the first radius, and the second mount 1510 is adapted to position the light illumination apparatus 506 within the second central opening 1574 whereby the directional illumination substantially aligns with the second directional illumination, and light from the light illumination apparatus passes through the second central opening, and light from the object illuminated by the light illumination apparatus and the secondary illumination passes through both the second central opening and the central opening to be received by the lens.

FIG. 8 shows an example of a perspective view of a light illumination apparatus for a circular system application. The housing 562 of the light illumination apparatus is substantially circular and the central opening 574 is also substantially circular. FIG. 8 also shows a multiplicity of regularly spaced radiating elements 572. In one example, only light illumination apparatus 506 is used with camera apparatus 512. In another example the secondary illumination apparatus 1506 is attached to the light illumination apparatus through interface 706 thereby enabling the direction and provision of additional illumination of object 508. In another example the secondary illumination apparatus 1506 is attached to the light illumination apparatus through interface 706, and the subsequent illumination apparatus 756 is attached to the secondary illumination apparatus 1506 through interface 708 thereby enabling the direction and provision of further additional illumination of object 508. The illumination surfaces of the light illumination apparatus, the secondary illumination apparatus, and/or the subsequent light illumination apparatus may be aligned to form an illumination system having a substantially planar illumination surface. In other applications more than one mount may be provided between the light illumination apparatus and the secondary illumination apparatus to provide a secure fit. Similarly, more than one mount may be provided between the secondary illumination apparatus and the subsequent illumination apparatus to provide a secure fit. Circular or substantially circular corresponds to a round shape having a radius that varies less than ten percent.

Figure 9:
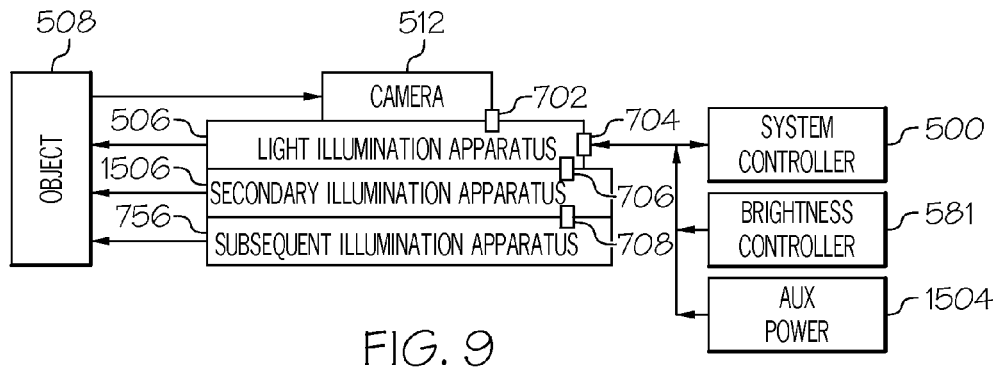
FIG. 9 shows an example of three light bars arranged in a stacked configuration with the camera apparatus atop a stack of the light illumination apparatus, the secondary illumination apparatus, and the subsequent illumination apparatus.
Figure 10:
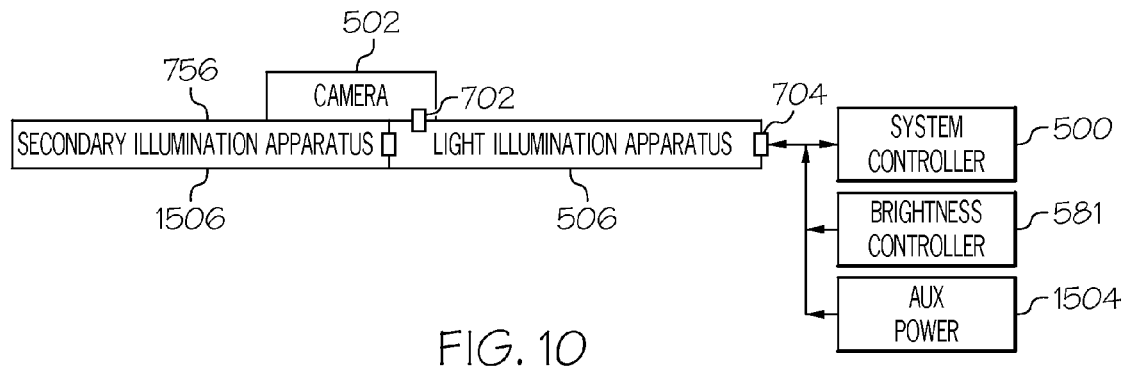
FIG. 10 shows an example of two light bars arranged in a linear configuration with the camera apparatus atop the light illumination apparatus and an end of the secondary illumination apparatus located adjacent to an end of the light illumination apparatus.
Figure 11:
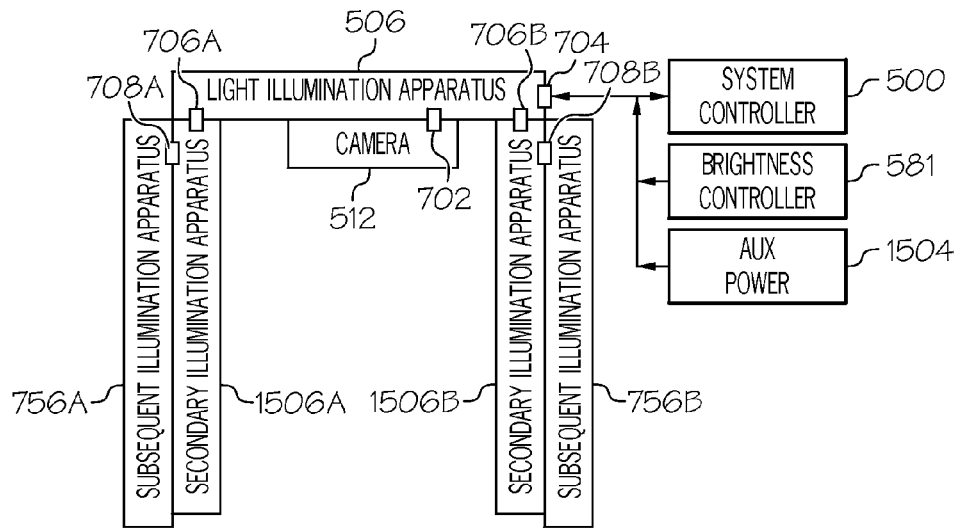
FIG. 11 shows an example of five light bars arranged in an inverted "U" configuration with the camera apparatus atop the light illumination apparatus.

FIG. 9, FIG. 10, and FIG. 11 show various arrangements of the camera apparatus, the light illumination apparatus, one or more secondary illumination apparatuses, and one or more secondary illumination apparatuses. In these figures, the light illumination apparatus 506 and the secondary illumination apparatus 1506 A/B are substantially rectangular in shape and may be referred to as light bars. The first interface 702 includes a primary mount for attaching the illumination apparatus 506 to a device, such as a manufacturing line or tripod, coupled to the object 508 and directing the directional illumination towards the object and, in an example using PoE, at least a first connector 550 receiving source power and communicating the data stream with the system controller 500. In an alternate non-PoE example, the first connector 550 communicates the data stream and an auxiliary connector 1502 of the first interface receives power from an auxiliary power source 1504. The second interface 702 includes a first mount 566 for removably affixing the camera apparatus 512 to the light illumination apparatus 506. The third interface 706 includes a second mount 1510 for removably affixing the secondary illumination apparatus to the light illumination apparatus, and the second mount is adapted to position the secondary illumination apparatus in a parallel orientation relative to the light illumination apparatus, whereby the directional illumination substantially aligns with the second directional illumination. The each secondary illumination apparatus may include a fourth interface which includes a subsequent mount 1590 for removably affixing the subsequent illumination apparatus 756 A/B to the secondary illumination apparatus, and the subsequent mount is adapted to position the subsequent illumination apparatus in a parallel orientation relative to the subsequent illumination apparatus whereby the subsequent directional illumination substantially aligns with the secondary directional illumination. Substantially rectangular means a three dimensional shape having substantially all right angles or ninety degree angles plus or minus ten percent.

FIG. 11 shows an example of three light bars arranged in a stacked configuration with the camera apparatus atop a stack of the light illumination apparatus, the secondary illumination apparatus, and the subsequent illumination apparatus. The light direction from each of the light bars is parallel and directed to illuminate the object.

FIG. 10 shows an example of two light bars arranged in a linear configuration with the camera apparatus atop the light illumination apparatus and an end of the secondary illumination apparatus located adjacent to an end of the light illumination module. The light direction from each of the light bars is parallel and directed to illuminate the object.

FIG. 11 shows an example of five light bars arranged in an inverted "U" configuration with the camera apparatus atop the light illumination apparatus. In this example, the light illumination apparatus has two third interfaces 706A and 706B for mounting and powering two secondary illumination apparatuses 1506A and 1506B. Each secondary illumination apparatus has a fourth interface 708A and 708B for mounting and powering corresponding subsequent illumination apparatuses 156A and 756B. The light direction from each of the light bars is parallel and directed to illuminate the object.

Figure 12:
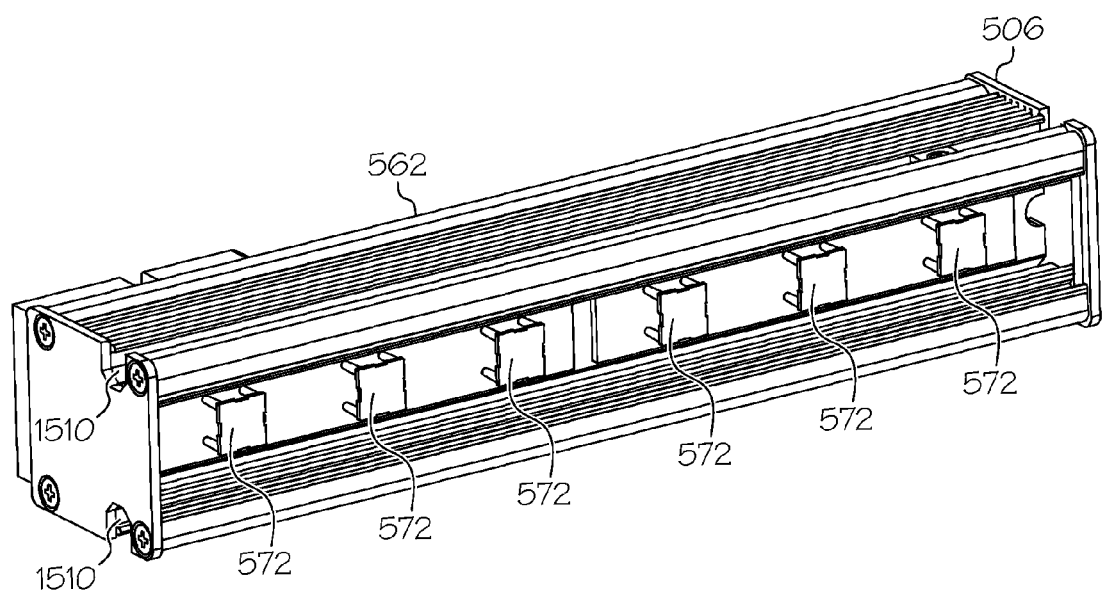
FIG. 12 shows an example of a perspective view of a light illumination apparatus for a rectangular or bar shaped system application.

FIG. 12 shows an example of a perspective view of a light illumination apparatus for a rectangular or bar shaped system application. The housing 562 of the light illumination apparatus is rectangular or bar shaped. FIG. 12 also shows a multiplicity of regularly spaced radiating elements 572. In one example, only light illumination apparatus 506 is used with camera apparatus 512. In another example the secondary illumination apparatus 1506 is attached to the light illumination apparatus through interface 706 thereby enabling the direction and provision of additional illumination of object 508. In another example the secondary illumination apparatus 1506 is attached to the light illumination apparatus through interface 706, and the subsequent illumination apparatus 756 is attached to the secondary illumination apparatus 1506 through interface 708 thereby enabling the direction and provision of further additional illumination of object 508. The illumination surfaces of the light illumination apparatus, the secondary illumination apparatus, and/or the subsequent light illumination apparatus may be aligned to form an illumination system having a substantially planar illumination surface. Slots 1510 shown in the housing 562 may form part of the first, second and/or subsequent mounts 566, 1510 1590.

Numerous shapes of illumination apparatuses and configurations of illumination apparatuses are considered to be within the scope of this description. An example of an alternate configuration includes a circular illumination apparatus may have a plurality of bar illumination apparatus atop and below its perimeter. Example of alternate shaped illumination apparatuses include triangular, square and elliptical. The interfaces between the various illumination apparatuses as well as the interface between the light illumination apparatus and the camera apparatus may be many forms while remaining within the scope of this description. For example, the mount and corresponding connector of an interface may be integrated in to a single electromechanical connector that both mounts and provides power and/or data communication. In another example, an interface may include mount that is a mechanical connection and a separate connector that provides power and/or data communication through a cable with a plug corresponding to the connector. The mount may rigidly affix the corresponding apparatuses to each other or allow relative movement in order to provide for a desired alignment, thereby allowing for direct or indirect or reflected illumination of the object by an illumination apparatus. The method of mechanically affixing may be any approach known to those familiar with the art an may include fasteners, screws, slots, clamps or other know approaches for removably attaching apparatuses to each other. Furthermore, the camera apparatus and any or all corresponding illumination apparatuses may be mounted to a common platform or device such as a manufacturing line instead of mounted to each other.

The principles of the description have been described with reference to the described examples. Modifications and variations could occur to those upon reading and understanding the preceding detailed description. It is intended that the scope of the claims be construed as including all such modifications and alterations insofar as they come within the scope of the appended claims or equivalents thereof.

The description of the present application has been presented for purposes of illustration and description, but is not intended to be exhaustive or limited to the description in the form disclosed. Many modifications and variations will be apparent without departing from the scope of the description. The examples were chosen and described in order to best explain the principles of the description and the practical application, and to enable the understanding of the description for various examples with various modifications as are suited to the particular use.

What is claimed is:

1. A light illumination apparatus comprising:
   an illumination module having a directional illumination for illuminating an object;
   a first interface for
      receiving source power, and
      communicating a data stream with a system controller, the data stream including a digital representation of an image of the object;
   a second interface for
      attaching a camera apparatus to the light illumination apparatus to receive the image of the object,
      transmitting power to the camera apparatus, and
      communicating the data stream with the camera apparatus; and
   a third interface for
      transmitting power to a secondary illumination apparatus having a second directional illumination, and
      mounting the secondary illumination apparatus to direct the second directional illumination to illuminate the object.

2. The light illumination apparatus of claim 1 wherein the first interface includes a primary mount for removably attaching the light illumination apparatus to a device coupled to the object and directing the directional illumination towards the object.

3. The light illumination apparatus of claim 1 wherein the first interface includes a first connector for communicating the data stream with the system controller and an auxiliary connector for receiving the source power from an auxiliary power source.

4. The light illumination apparatus of claim 1 wherein the first interface includes a first connector for receiving an integrated power and data stream from the system controller, the integrated power and data stream having the source power combined with the data stream on a conductor of the first connector.

5. The light illumination apparatus of claim 4 wherein
   the source power includes a source power component at a source voltage,
   the transmitted power to the camera apparatus includes a second power component at a second voltage,
   the illumination apparatus is powered by a third power component at a third voltage, and
   the transmitted power to the secondary illumination apparatus includes a fourth power component at a fourth voltage, wherein the light illumination apparatus further comprises a power extraction module for
extracting the source power component from the integrated power and data stream,
extracting the data stream from the integrated power and data stream,
communicating the data stream between the first connector and the second interface,
converting a first portion of the source power component to a first power component at a first voltage, the first voltage being different from the source voltage,
applying the first power component to the illumination module,
converting a third portion of the source power component to the third power component at the third voltage, the third voltage being different from the source voltage, and
applying the third power component to the third interface; and
a housing adapted to house the first interface, the second interface, the third interface, the illumination module, and the power extraction module.

6. The light illumination apparatus of claim 1 wherein
   the first interface includes
      a first connector for receiving the data stream from the system controller, and
      an auxiliary connector for receiving the source power from an auxiliary power source,
   the second interface includes a second connector for providing an integrated power and data stream to the camera apparatus, the integrated power and data stream including the transmitted power to the camera apparatus and the data stream communicated with the camera apparatus,
   the source power includes a source power component at a source voltage, the transmitted power to the camera apparatus includes a second power component at a second voltage, the illumination module is powered by a third power component at a third voltage, and the transmitted power to the secondary illumination apparatus includes a fourth power component at a fourth voltage, wherein the light illumination apparatus further comprises a power extraction module for converting a first portion of the source power component to a first power component at a first voltage, the first voltage being different from the source voltage, applying the first power component to the illumination module, converting a second portion of the source power component to the second power component at the second voltage, the second voltage being different from the source voltage and the first voltage, integrating the second power component and the data stream communicated with the system controller to produce an integrated camera module power and data stream, applying the integrated camera module power and data stream to the second connector, converting a third portion of the source power component to the third power component at the third voltage, the third voltage being different from the source voltage and the second voltage, and applying the third power component to the third interface; and a housing adapted to house the first interface, the second interface, the third interface, the illumination module, and the power extraction module.

7. The light illumination apparatus according to claim 1 wherein the second interface includes a first mount for attaching the camera apparatus to the light illumination apparatus and directing the camera apparatus to receive the image of the object and at least a second connector for transmitting the power to the camera apparatus and communicating the data stream with the camera apparatus.

8. The light illumination apparatus according to claim 1 wherein the third interface includes a second mount for attaching the secondary illumination apparatus to the light illumination apparatus and directing the second directional illumination towards the object and a fourth connector for transmitting the power to the secondary illumination apparatus.

9. The light illumination apparatus of claim 1 wherein
the first interface includes a primary mount for attaching the illumination apparatus to a device coupled to the object and directing the directional illumination towards the object and at least a first connector receiving source power and communicating the data stream with the system controller, the second interface includes a first mount for attaching the camera apparatus to the light illumination apparatus and directing the camera apparatus to receive the image of the object, and at least a second connector for transmitting the power to the camera apparatus and communicating the data stream with the camera apparatus, the third interface includes a second mount for attaching the secondary illumination apparatus to the light illumination apparatus and directing the second directional illumination towards the object and a fourth connector for transmitting the power to the secondary illumination apparatus.

10. The light illumination apparatus according to claim 1 wherein the third interface includes a second mount for attaching the secondary illumination apparatus to the light illumination apparatus and directing the second directional illumination towards the object and a fourth connector for transmitting the power to the secondary illumination apparatus and for transmitting power to a subsequent illumination apparatus, the secondary illumination apparatus including a subsequent mount for attaching the subsequent illumination apparatus to the secondary illumination apparatus and directing illumination from the subsequent illumination apparatus towards the object.

11. The light illumination apparatus according to claim 1 further comprising a brightness control interface for receiving a brightness control signal wherein the light illumination apparatus adjusts the intensity of the directional illumination based upon the brightness control signal, and the third interface further communicates the brightness control signal to the secondary illumination apparatus thereby enabling the secondary illumination apparatus to adjust the intensity of the second directional illumination based upon the brightness control signal.

12. The light illumination apparatus according to claim 11 wherein the third interface includes a second mount for attaching the secondary illumination apparatus to the light illumination apparatus and directing the second directional illumination towards the object and a fourth connector for transmitting the brightness control signal and the power to the secondary illumination apparatus.

13. The light illumination apparatus of claim 1 wherein
the light illumination apparatus has a substantially circular shape having a first radius and also has a central opening, the second interface includes a first mount for removably affixing the camera apparatus to the light illumination apparatus, the third interface includes a second mount for removably affixing the secondary illumination apparatus to the light illumination apparatus, the camera apparatus has a lens for receiving images, the first mount is adapted to position the lens within the central opening, the secondary illumination apparatus includes a second central opening larger than the first radius, and the second mount is adapted to position the light illumination apparatus within the second central opening whereby the directional illumination substantially aligns with the second directional illumination, and light from the light illumination apparatus passes through the second central opening, and light from the object illuminated by the light illumination apparatus and the secondary illumination passes through both the second central opening and the central opening to be received by the lens.

14. The light illumination apparatus of claim 1 wherein
the light illumination apparatus and the secondary illumination apparatus are substantially rectangular in shape, the second interface includes a first mount for removably affixing the camera apparatus to the light illumination apparatus, the third interface includes a second mount for removably affixing the secondary illumination apparatus to the light illumination apparatus, and the second mount is adapted to position the secondary illumination apparatus in a parallel orientation relative to the light illumination apparatus whereby the directional illumination substantially aligns with the second directional illumination.

15. A light illumination apparatus comprising:
a first connector for receiving an integrated power and data stream from an external system controller, the integrated power and data stream having a source power component at a source voltage combined with a data stream component on a conductor of the first connector;
an illumination module for generating light upon receiving a first power component at a first voltage;
a second connector for communicating the data stream component with an external camera apparatus, the external camera apparatus for modulating the data stream component with a digital representation of a received image;
a fourth connector for communicating a third power component at a third voltage to a secondary illumination apparatus;
a power extraction module coupled to the first connector, the fourth connector, and the illumination module, the power extraction module adapted to
extract the source power component from the integrated power and data stream,
extract the data stream component from the integrated power and data stream,
communicate the data stream component between the first connector and the second connector,
convert a first portion of the source power component to the first power component at the first voltage,
apply the first power component to the illumination module,
convert a third portion of the source power component to the third power component at the third voltage, and
apply the third power component to the fourth connector; and
a housing adapted to house the first connector, the illumination module, the second connector, the fourth connector, and the power extraction module.

16. The light illumination apparatus of claim 15 wherein the housing further includes:
a first mount for removably affixing the external camera apparatus to the light illumination apparatus,
a second mount for removably affixing the light illumination apparatus to the secondary illumination apparatus, wherein
the illumination module generates light which radiates in a radiation direction,
the secondary illumination apparatus illuminates light in a secondary radiation direction,
the external camera apparatus captures images received in a viewing direction,
the first mount aligns the viewing direction with the radiation direction, and
the second mount aligns the secondary radiation direction with the radiation direction.

17. The light illumination apparatus of claim 15 wherein a format of the integrated power and data stream includes one of GigE with PoE, CXP, and USB.

18. The light illumination apparatus of claim 15 wherein the illumination module includes an at least one illumination element for converting the first power component into light, the at least one illumination element comprised of one of an LED, an incandescent light bulb, a laser, a gas discharge tube, and a fluorescent tube.

19. The light illumination apparatus of claim 15 further comprising an illumination brightness controller coupled to the light illumination apparatus and adapted adjust the brightness of the light generated by the illumination module and the secondary illumination apparatus based upon a brightness signal and the illumination brightness controller includes at least one of
a circuit in the power extraction module for processing the brightness signal from the external camera apparatus,
a manual input device including one of
a switch,
a plurality of switches and
a rotary knob for receiving the brightness signal based upon a manual input,
a wireless module including one of
a RF module,
a WiFi module and
a Bluetooth module for receiving the brightness signal based upon a wireless signal from an external brightness controller, and
a connector for receiving the brightness signal based upon one of
a wired signal and
an optical signal received from the external brightness controller, wherein the illumination brightness controller is coupled to the fourth connector to communicate the brightness signal the secondary illumination apparatus.

20. An imaging system comprising:
an external camera apparatus for receiving and digitizing an image of an object;
a light illumination apparatus for illuminating the object; and
a secondary illumination apparatus for illuminating the object, the light illuminating apparatus having:
a first interface for
receiving source power, and
communicating a data stream with an external system controller, the data stream including a digital representation of an image of the object;
a second interface for
attaching an external camera apparatus to the light illumination apparatus to receive an image of the object,
transmitting power to the external camera apparatus, and
communicating data between the external camera apparatus and the external system controller including the digital representation of the image from the external camera apparatus; and
a third interface for
transmitting power to a secondary illumination apparatus having a second directional illumination, and
mounting the secondary illumination apparatus to the light illuminating apparatus and direct the second directional illumination to illuminate the object.

* * * * *